UNITED STATES PATENT OFFICE.

GUSTAVE DOSSELMAN AND PERCY NEYMANN, OF CHICAGO, ILLINOIS, ASSIGNORS TO CHADELOID CHEMICAL COMPANY, OF NEW YORK, N. Y., A CORPORATION OF WEST VIRGINIA.

PROCESS FOR REMOVING SURFACE FINISHES.

No. 907,685.      Specification of Letters Patent.      Patented Dec. 22, 1908.

Original application filed June 24, 1903, Serial No. 162,885. Divided and this application filed October 12, 1907. Serial No. 397,087.

*To all whom it may concern:*

Be it known that we, GUSTAVE DOSSELMAN and PERCY NEYMANN, residents of Chicago, in the county of Cook and State of Illinois, have invented certain new and useful Improvements Relating to Processes for Removing Surface Finishes, of which the following is a specification.

Our invention relates generally to the removal from a surface of previously applied finish, such, for instance, as varnish, paint, enamel, shellac, gums and lacquers, thereby restoring the treated surface to its original condition prior to the application of the finish.

The usual method of removing varnish or other finish from surfaces, such for instance, as wood work, preparatory to refinishing them, involves the slow and tedious process of removing the finish from the surface by scraping with a sharp instrument or by burning. Our invention, on the contrary, provides for the easy and thorough removal of the varnish or other finish from surfaces and obviates the labor incident to scraping or burning. According to our invention, a composition of matter is provided which when applied to the finish surface will attack and dissolve the finish so that it may be removed from the surface simultaneously with the removal of the composition. This removing composition comprises a liquid which will attack and dissolve the varnish or other finish upon a surface and evaporation retarding substance which will prevent the too rapid drying of the liquid after it has dissolved the finish, so that the dissolved finish will be removed simultaneously with the removal of the composition. In preparing such removers or compositions of matter for removing varnish and other finish from surfaces, paraffin, benzol and acetone are preferably combined in proportions suitable to accomplish the desired result. A remover consisting of 45 pounds of paraffin, 135 gallons of benzol and 137 gallons of acetone gives excellent results in practice and the method of use merely involves the application of the remover to the surface from which the finish is to be removed and the subsequent removal of the composition from the surface which simultaneously removes the finish which has been attacked and dissolved, thereby leaving the surface entirely free from the finish and in the same condition in which it was prior to the application of the finish thereto. The benzol and acetone in this remover attack and dissolve the varnish or other finish while the paraffin prevents the benzol and acetone from drying before the layer of composition is removed from the surface.

While paraffin is preferably used as the evaporation retarding ingredient, which prevents the too rapid drying of the composition, other forms of wax or wax-like material may be used, such as mineral wax, including the hydrocarbons akin to paraffin, vegetable wax, such as carnauba, or animal wax-like material, such as beeswax or fatty acids. Instead of benzol alcohol may be used in the remover or other solvents of a generally benzolic character, such as other coal tar products similar to benzol, or petroleum products, such as benzin, may be employed.

It is to be understood that the term wax is used in the broad sense to include any of the above specified waxes or wax-like materials or equivalent evaporation retarding materials.

The composition may be made in liquid form by placing the benzol or equivalent solvent in the receptacle or mixing tank and adding the paraffin or other evaporation retarding ingredient either in a melted condition or in the form of small particles after which the acetone is added. The remover may also be made in the form of a semi-paste, in which case additional thickening material in the form of ceresin wax may be used in addition to the ingredients comprised in the liquid form of remover. A suitable semi-paste remover for practical conditions of operation may comprise 40 pounds of paraffin, 40 pounds of ceresin wax, 140 gallons of benzol and 140 gallons of acetone. The semi-paste composition can be manufactured by first melting the paraffin and ceresin wax together and adding them to the benzol and acetone or the waxes may be dissolved in the benzol.

When alcohol is used as indicated above in place of benzol in these illustrative removers, the liquid remover would comprise 45 pounds of paraffin, 135 gallons of alcohol and 137 gallons of acetone and the semi-paste remover would comprise 40 pounds of paraffin, 40 pounds of ceresin wax, 140 gallons of alcohol and 140 gallons of acetone, these ingredients being preferably thoroughly incorporated in a suitable mixing tank in which the waxy material may be first melted, as indicated.

By the use of removers or compositions of matter composed of the ingredients above described or their equivalents, not only varnish may be removed from surfaces, but other forms of finish by the application of the remover to the surface and the subsequent removal of the composition whereby the surface is restored to its original condition prior to the application of the finish thereto.

Having thus described the invention in this application, which is a divisional continuation of United States patent application, 162,885, filed June 24, 1903, in connection with a number of illustrative ingredients, formulas, and methods of preparation and use, to the details of which disclosure the invention is not, of course, to be limited, what is claimed is:—

1. The process of removing paint or similar finish coatings which consists in applying to the paint or similar finish remover substantially neutral to wood and to skin and comprising composite finish softening material including aromatic solvent and incorporated colloidal material thickening the remover and retarding the evaporation of the volatile material in the remover, in allowing the remover to remain on the finish until the finish softening material has attacked and loosened the same while excessive evaporation of the volatile material in the remover is retarded by the incorporated thickening material and in substantially simultaneously removing the treated finish and remover applied thereto so as to leave the supporting surface in substantially its original condition prior to the application of the finish thereto.

2. The process of removing paint or similar finish coatings which consists in applying to the paint or similar finish remover substantially neutral to wood and comprising composite finish softening material including aromatic softening material and incorporated colloidal material thickening the remover and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

3. The process of removing paint or similar finish coatings which consists in applying to the paint or similar finish remover substantially neutral to wood and comprising composite finish softening material including aromatic softening material and incorporated substantially solid material thickening the remover to semi-pasty substantially fluent consistency and retarding evaporation of the volatile material in the remover, in allowing the remover to remain on the finish until the finish softening material has attacked and softened the same while the excessive evaporation of the volatile material in the remover is retarded by the incorporated thickening material, and in removing the treated finish and remover applied thereto so as to leave the supporting surface in substantially its original condition prior to the application of the finish thereto.

4. The process of removing paint or similar finish coatings which consists in applying to the finish remover substantially neutral to wood and comprising organic finish softening material and incorporated thickening material comprising paraffin thickening the remover and retarding evaporation of the volatile material in the remover, in allowing the remover to remain on the finish until the finish softening material has attacked and softened the same while the excessive evaporation of the volatile material in the remover is effectively prevented by the incorporated thickening material, and in removing the treated finish and remover applied thereto.

5. The process of removing paint or similar finish coatings which consists in applying to the finish remover substantially neutral to wood and comprising organic finish softening material including ketonic softening material and incorporated substantially solid material thickening the remover and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

6. The process of removing paint or similar finish coatings which consists in applying to the finish remover substantially neutral to wood and consisting largely of organic finish softening material and incorporated thickening material comprising waxy material increasing the consistency of the remover and retarding evaporation of the volatile material in the remover and in allowing the remover to remain on the surface until the finish softening material has attacked and softened the finish while the excessive evaporation of the volatile material in the remover is effectively prevented by the action of incorporated thickening material and in removing the treated finish and remover applied thereto.

7. The process of removing paint or similar finish coatings which consists in applying to the finish remover substantially neutral to wood and consisting largely of organic finish softening material and incorporated substantially solid thickening material increasing the consistency of the remover and retarding excessive evaporation of the volatile material in the remover, in allowing the remover to remain on the surface until the finish softening material has attacked and softened the finish while the excessive evaporation of the volatile material in the remover is retarded by the action of the incorporated thickening material and in removing the treated finish and remover applied thereto.

8. The process of removing finish from a surface which consists in applying thereto substantially fluent remover comprising composite finish softening material including ketonic material and incorporated colloidal material giving increased consistency to the remover to retard excessive flowing of the remover over the finish surface and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

9. The process of removing finish from a surface which consists in applying thereto substantially fluent remover consisting largely of composite finish softening material including ketonic material and incorporated substantially waxy material giving increased consistency to the remover to retard excessive flowing of the remover over the finish surface and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

10. The process of removing finish coatings which consists in applying to the finish remover substantially neutral to wood and comprising finish softening material and incorporated thickening material comprising substantially waxy material thickening the remover to semi-pasty substantially fluent consistency preventing the undesirable flowing of the remover over the surface and retarding the evaporation of the volatile material in the remover, in allowing the remover to remain on the finish until the finish softening material has attacked and softened the same while excessive evaporation of the volatile material is effectively prevented by the incorporated thickening material and in removing the treated finish and remover applied thereto.

11. The process of removing finish coatings which consists in applying to the finish remover substantially neutral to wood consisting largely of volatile organic finish softening material and incorporated thickening material comprising paraffin increasing the consistency of the remover and retarding evaporation of the volatile material in the remover, in allowing the remover to remain on the finish surface until the finish softening material has attacked and softened the finish while the excessive evaporation of the volatile material in the remover is effectively prevented by the action of the incorporated thickening material and in removing the treated finish and remover applied thereto.

12. The process of removing finish coatings which consists in applying to the finish remover substantially neutral to wood and consisting largely of volatile organic finish softening material comprising ketonic material and incorporated substantially solid thickening material increasing the consistency of the remover and retarding the excessive evaporation of the volatile material therein, in allowing the remover to remain on the finish surface until the finish softening material has attacked and softened the finish while the excessive evaporation of the volatile material in the remover is retarded by the action of the incorporated thickening material and in removing the treated finish and remover applied thereto.

13. The process of removing finish coatings which consists in applying to the finish remover substantially neutral to wood and comprising composite finish softening material including aromatic softening material and incorporated thickening material including paraffin thickening the remover and retarding evaporation of the volatile material in the remover, in allowing the remover to remain on the finish until the finish softening material has attacked and softened the same while the excessive evaporation of the volatile material in the remover is effectively prevented by the action of the incorporated thickening material on the exposed surface of the remover and in removing the treated finish and remover applied thereto.

14. The process of removing finish from a surface which consists in applying thereto substantially fluent remover comprising composite finish softening material including benzol and incorporated colloidal material thickening the remover to retard excessive flowing of the remover over the finish surface and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

15. The process of removing finish from a surface which consists in applying thereto substantially fluent remover comprising composite finish softening material, including aromatic softening material and incorporated colloidal material giving increased consistency to the remover to retard excessive flowing of the remover over the finish surface and retarding evaporation of the volatile material in the remover, in allowing the remover to remain on the finish until the finish softening material has attacked and softened the finish while the excessive evaporation of the volatile material in the remover is retarded by the incorporated thickening material and in removing the treated finish and remover applied thereto.

16. The process of removing finish coatings which consists in applying to the finish substantially fluent remover substantially neutral to wood consisting largely of organic finish softening material and incorporated thickening material including waxy material giving the remover increased consistency and retarding evaporation of the volatile material in the remover, in allowing the remover to remain on the surface until the finish softening material has attacked and softened the finish while the excessive evaporation of the volatile material in the remover is retarded by the action of the incorporated thickening material and removing the treated finish and remover applied thereto.

17. The process of removing finish coatings which consists in applying to the finish remover substantially neutral to wood and comprising composite finish softening material including ketonic and aromatic softening material and incorporated colloidal material thickening the remover to retard undesirable flowing of the remover over the surface and retarding evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto so as to leave the supporting surface in substantially its original condition prior to the application of the finish thereto.

18. The process of removing finish coatings which consists in applying to the finish substantially fluent remover substantially neutral to wood and consisting largely of organic finish softening material and incorporated substantially solid thickening material increasing the consistency of the remover, retarding excessive flowing of the remover over the finish surface and retarding the excessive evaporation of the volatile material in the remover, in allowing the remover to remain on the finish surface until the finish softening material has attacked and softened the same while excessive evaporation of the volatile material in the remover is retarded and undesirable flowing of the remover over the surface retarded by the incorporated thickening material and in substantially simultaneously removing the treated finish and remover applied thereto.

19. The process of removing finish coatings which consists in applying to the finish remover substantially neutral to wood and comprising composite finish softening material including aromatic softening material and incorporated substantially waxy material thickening the remover and retarding the evaporation of the volatile material in the remover, in allowing the remover to remain on the finish until the finish softening material has attacked and softened the same while the excessive evaporation of the volatile material in the remover is retarded by the incorporated thickening material and in removing the treated finish and remover applied thereto.

GUSTAVE DOSSELMAN.
PERCY NEYMANN.

Witnesses as to Dosselman:
OTTO A. ROHR,
F. A. FARRAR.

Witnesses as to Neymann:
R. J. TYSON,
J. E. HALL.